United States Patent
Hewitson

(10) Patent No.: US 8,754,374 B1
(45) Date of Patent: Jun. 17, 2014

(54) SYSTEM TO COMPLETELY MEASURE MULTIPLE DENSITIES AT VARYING LEVELS IN TANKS

(75) Inventor: John A. Hewitson, Valencia, CA (US)

(73) Assignee: Ronan Engineering Company, Valencia, CA (US)

(*) Notice: Subject to any disclaimer, the term of this patent is extended or adjusted under 35 U.S.C. 154(b) by 66 days.

(21) Appl. No.: 13/586,297

(22) Filed: Aug. 15, 2012

(51) Int. Cl.
*G01F 23/00* (2006.01)

(52) U.S. Cl.
USPC .................................................... 250/357.1

(58) Field of Classification Search
CPC ............................ G01F 23/288; G01F 23/2885
USPC ......................................................... 250/357.1
See application file for complete search history.

(56) References Cited

U.S. PATENT DOCUMENTS

| | | | | |
|---|---|---|---|---|
| 3,378,074 A | * | 4/1968 | Kiel | 166/308.4 |
| 4,687,585 A | * | 8/1987 | Ramshaw | 210/787 |
| 5,032,273 A | * | 7/1991 | Senyard et al. | 210/494.2 |
| 5,344,255 A | * | 9/1994 | Toor | 405/128.75 |
| 7,986,766 B2 | * | 7/2011 | Cahill | 378/54 |
| 2012/0285892 A1 | * | 11/2012 | Tuckett et al. | 210/703 |

* cited by examiner

*Primary Examiner* — David Porta
*Assistant Examiner* — Mindy Vu
(74) *Attorney, Agent, or Firm* — Thomas I. Rozsa

(57) ABSTRACT

A system to completely measure multiple densities in varying levels in tanks or vessels. The present invention provides an individual sensor at each measuring level in the tank, each sensor provided with electronic data to provide continuous density data at leach level. Each sensor is individually placed in the sensor array. If a sensor malfunctions, the individual sensor can be replaced without interrupting the data transmissions or requiring a shutdown of the system to remove the single row array of sensors which are placed together as in the prior art. Each sensor also includes a cooling pipe to cool components with recirculating water.

21 Claims, 10 Drawing Sheets

SEPARATION TANK

PROFILER DETECTS EACH LEVEL OF SAND, WATER, EMULSION AND OIL
FLOWING OVER THE WEIR PLATE

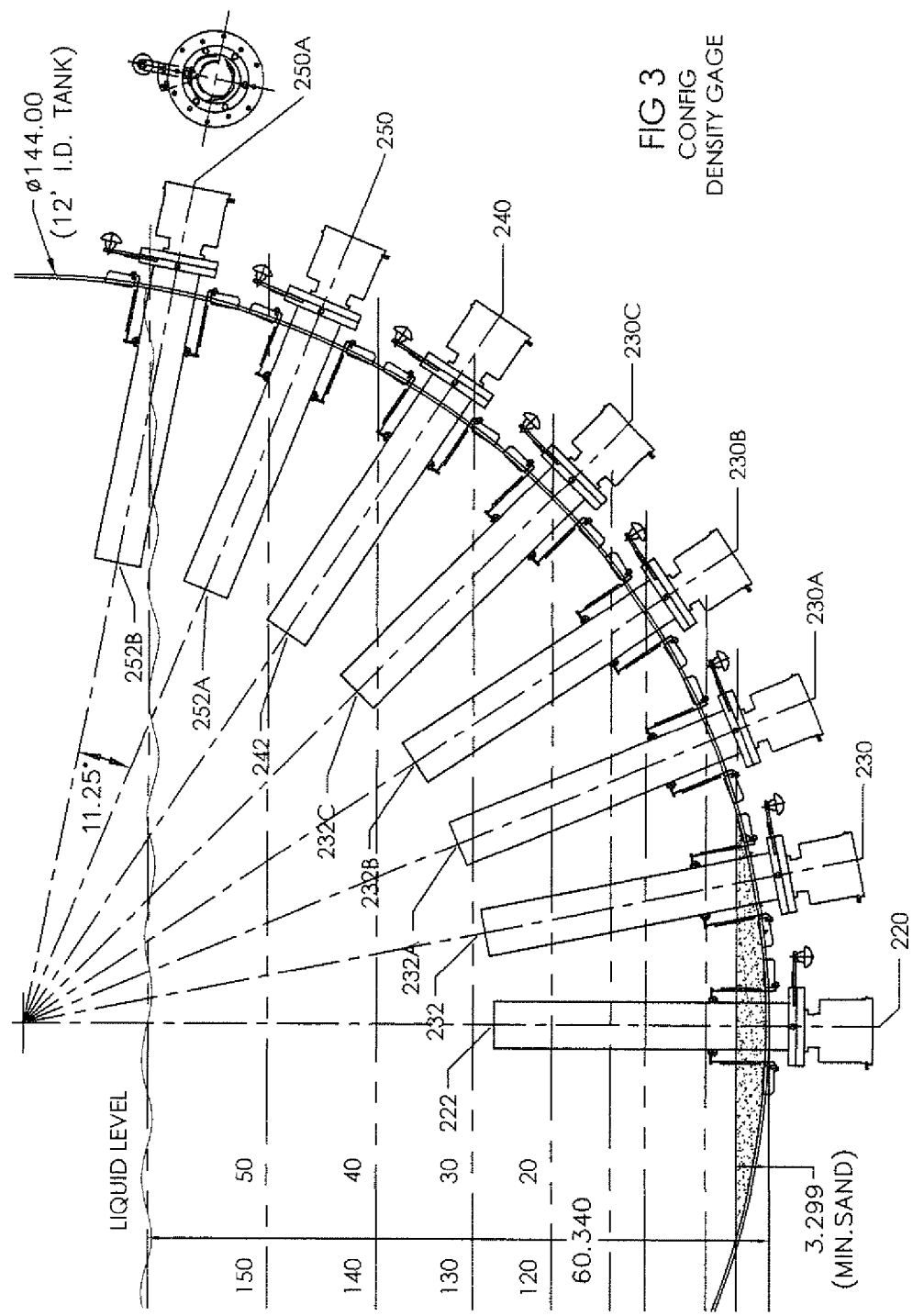

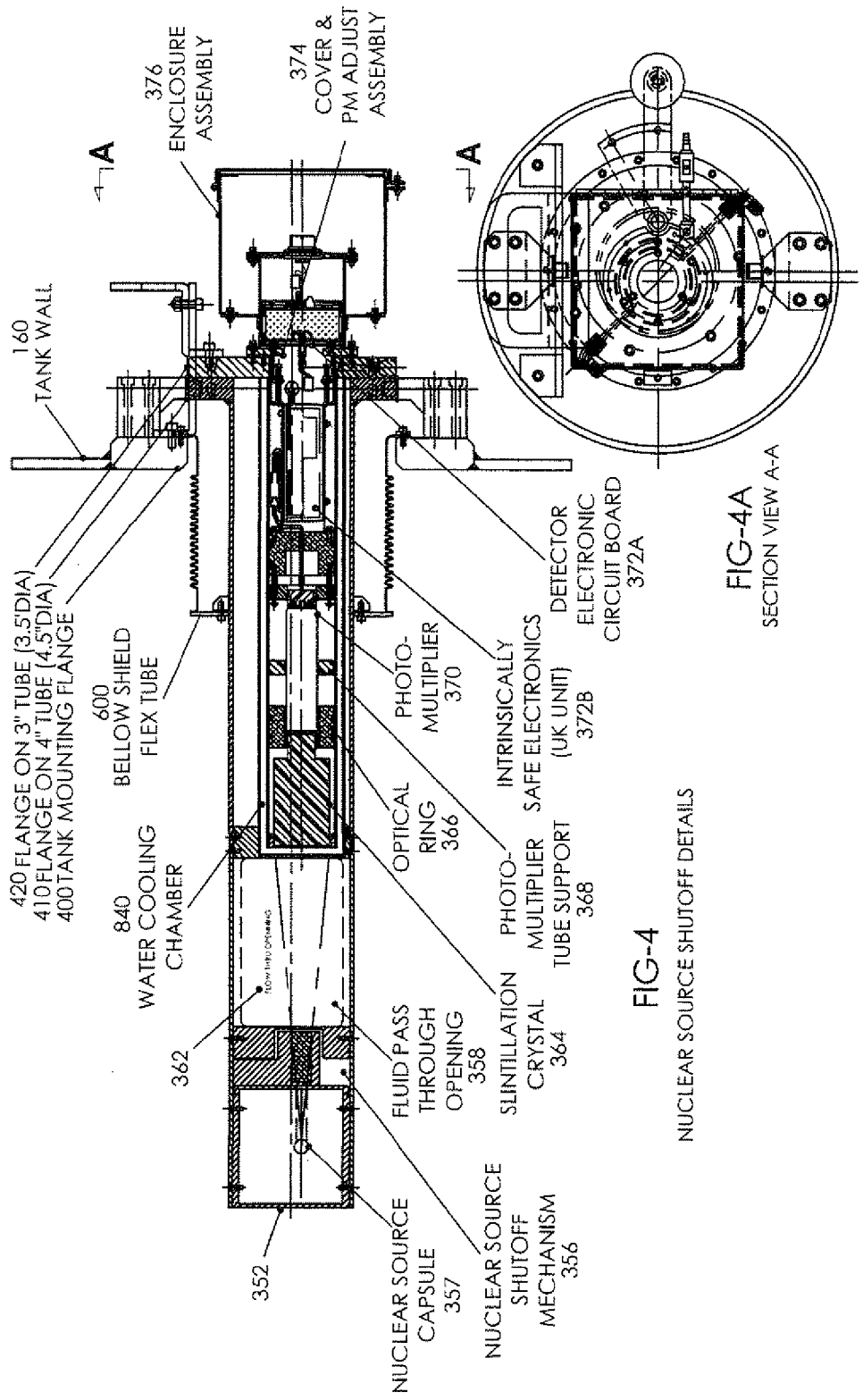

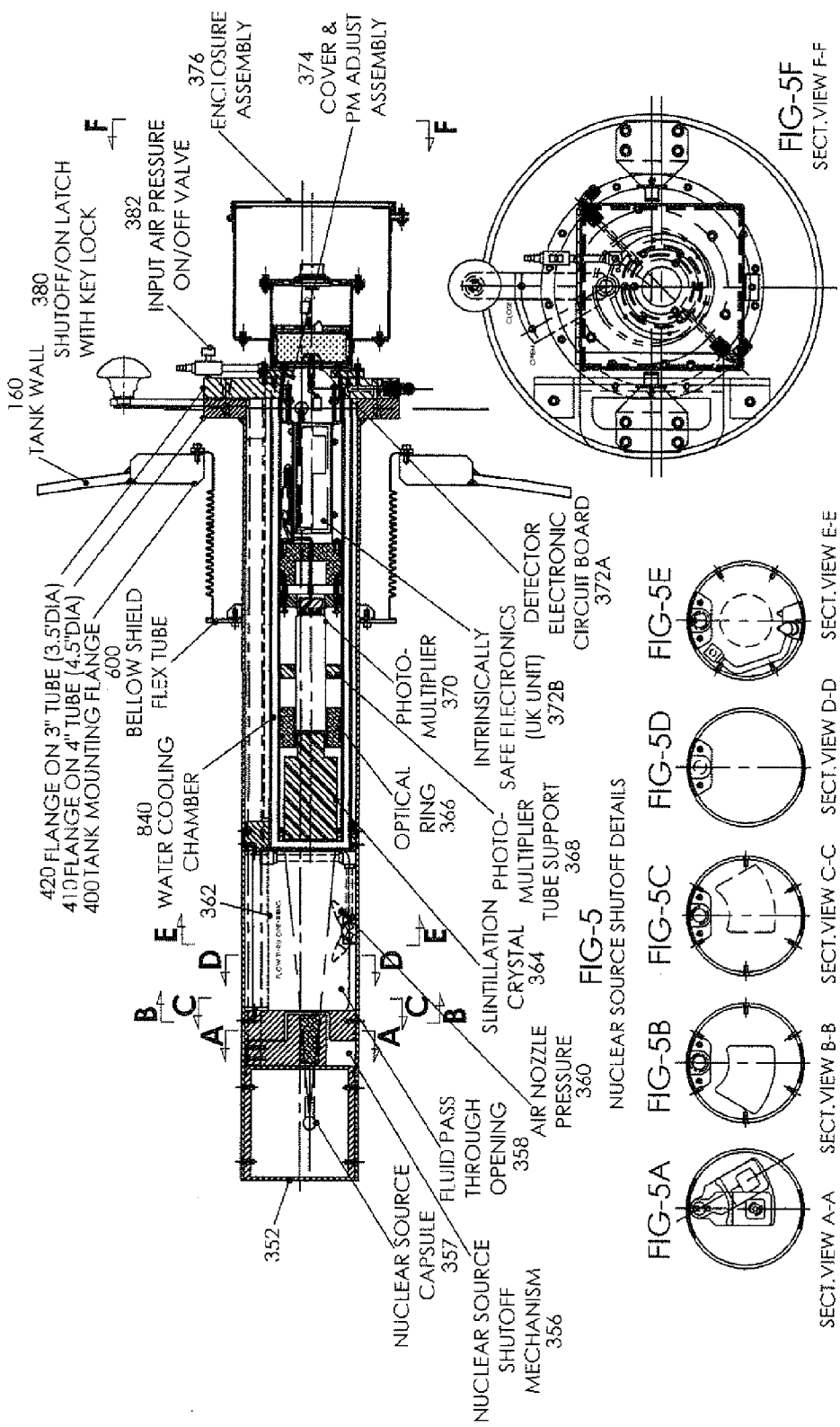

CONFIGURATION
DENSITY GAGE
INITIAL AT 0 DEG
POSITION

CONFIGURATION
DENSITY GAGE
SWING AT 15 DEG UP
POSITION

CONFIGURATION
DENSITY GAGE
SWING AT 15 DEG DOWN
POSITION

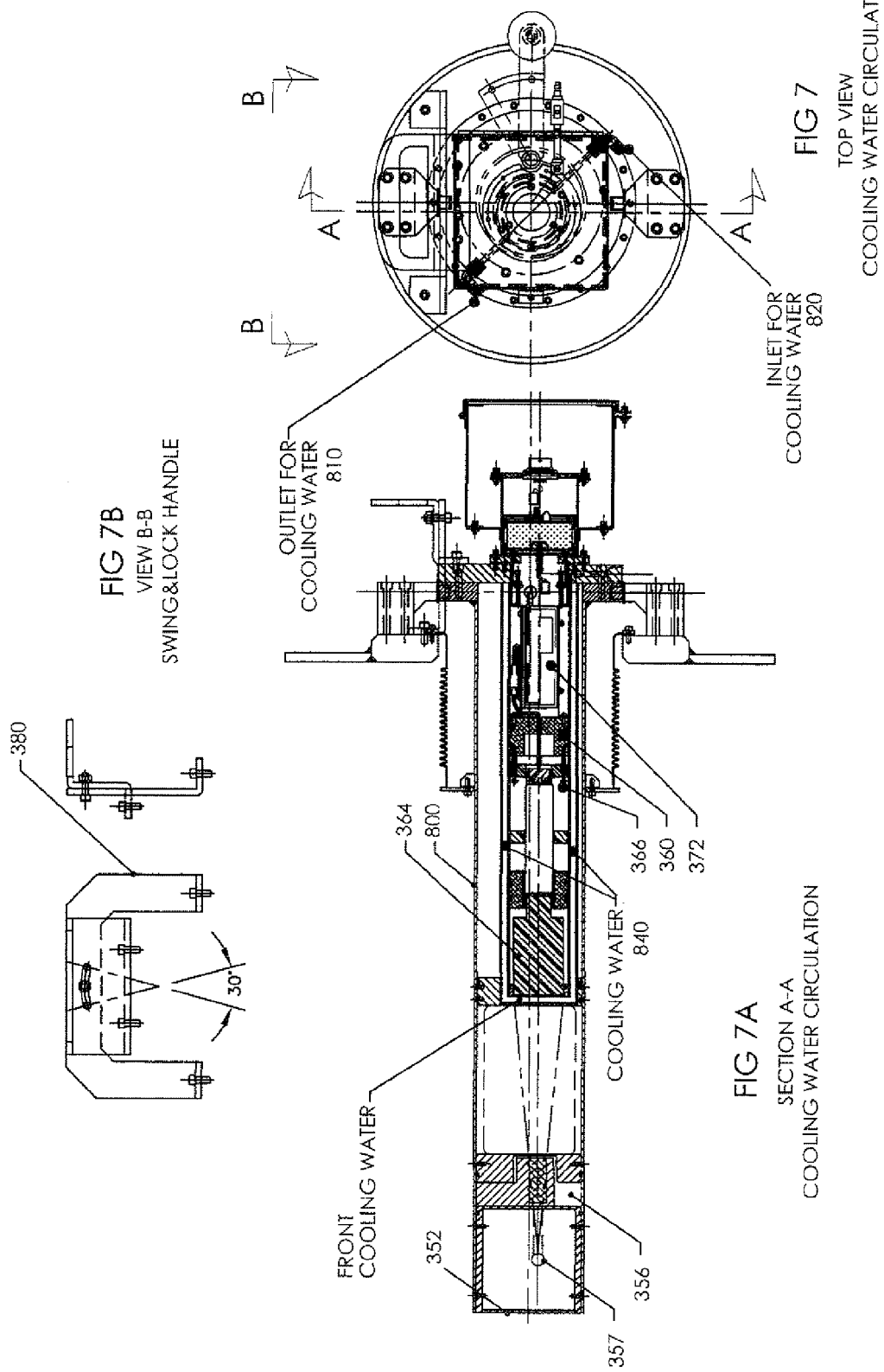

TOP VIEW
COOLING WATER CIRCULATION

SECTION A-A
COOLING WATER CIRCULATION

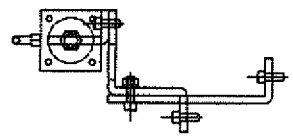
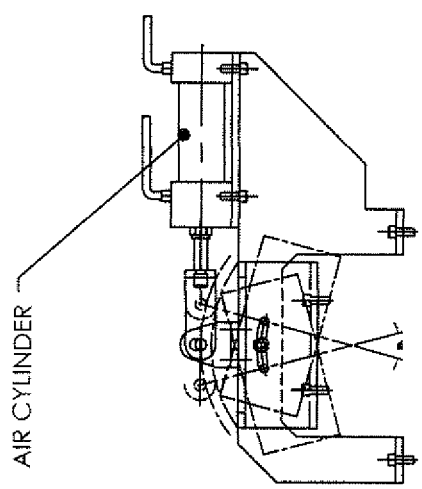
FIG 8B
VIEW B-B
DETECTOR
ANGULAR CONTROL
(AIR CYLINDER)

SYSTEM TO COMPLETELY MEASURE MULTIPLE DENSITIES AT VARYING LEVELS IN TANKS

BACKGROUND OF THE INVENTION

1. Field of the Invention

The present invention relates to the field of measuring densities in a combination liquid such as oil and water which have been extracted from the ground, either through on land drilling or offshore drilling.

2. Description of the Prior Art

In general, conventional methods to determine the percentage of drill results which is oil is known. The prior art sensors are placed in a single longitudinal array, so if a sensor malfunctions, the entire sensor array must be removed from the measuring tank and the defective sensor replaced. This results in downtime as the system must be shut down to replace the malfunctioning sensor in the sensor array. The tank must also be emptied to repair the malfunctioning sensor.

There is a significant need for an improvement in the prior art systems.

SUMMARY OF THE INVENTION

The present invention is a system to completely measure multiple densities in varying levels in tanks or vessels. The present invention provides an individual sensor at each measuring level in the tank, each sensor provided with electronic data to provide continuous density data at leach level. Each sensor is individually placed in the sensor array. If a sensor malfunctions, the individual sensor can be replaced without interrupting the data transmissions and not requiring a shutdown of the system to remove the single row array of sensors which are placed together as in the prior art. Each sensor can also be rotated in a clockwise and counter-clockwise direction to increase the range of sensor reading of each individual sensor.

The flow of oil and other materials is pumped out of the ground, either through on-land drilling or offshore drilling and then the oil and remaining materials are caused to flow into a separation tank through an inlet. The oil and other materials are caused to flow over a weir which is a filter. The heaviest material which usually is sand falls to the lowest level. The second heaviest material which is water falls to the next higher level. The third heaviest material which is emulsion flows to the next higher level. The lightest material which is oil floats on the top level.

The sensors are placed in an array around the separation tank, with each individual sensor aligned with a given level. Each individual sensor is completely independent from all other sensors and can have the electronic measurement section removed separately without affecting the outputs of any other sensor in the system and additionally allowing the balance of systems to maintain complete operation.

Each sensor is comprised of its own nuclear shutoff provision to allow each electronic section to be removed safely for servicing or complete replacement without shutting down the system and without any requirement to empty the tank for service as is the case in many of the prior art systems.

The flow through each section of each profiler or sensor can be equipped with tubing and nozzles to clean the nuclear source surface during normal operation to maintain the best possible reading of the profiler.

Each sensor is also mounted on rotation means which enable each individual sensor to be rotated by a given amount such as up to fifteen degrees in either a clockwise direction and/or a counterclockwise direction. This action allows for individual height settings within the 30 degree movement for each sensor.

The present invention provides the following significant advantages:

(1) Greater on-line time for the system;
(2) Minimum down time in replacement or repair of electronic sections;
(3) Greater accuracy of density reading;
(4) Ability to clean detector while in service;
(5) Choice of positions of detectors and numbers of detectors to install to obtain the best operational result.

It is an object of the present invention to provide a system to completely measure multiple densities in varying levels in tanks or vessels. The present invention provides an individual sensor at each measuring level in the tank, each sensor provided with electronic data to provide continuous density data at leach level. Each sensor is individually placed in the sensor array. If a sensor malfunctions, the individual sensor can be replaced without interrupting the data transmissions or requiring a shutdown of the system to remove the single row array of sensors which are placed together as in the prior art.

It is a further object of the present invention to provide a system where the flow of oil and other materials is pumped out of the ground, either through on-land drilling or offshore drilling and then the oil and remaining materials are caused to flow into a separation tank through an inlet. The oil and other materials are caused to flow over a weir which is a filter. The heaviest material which usually is sand falls to the lowest level. The second heaviest material which is water falls to the next higher level. The third heaviest material which is emulsion flows to the next higher level. The lightest material which is oil floats on the top level.

It is an additional object of the present invention to provide a system where the sensors are placed in an array around the separation tank, with each individual sensor aligned with a given level. Each individual sensor is completely independent from all other sensors and can have the electronic measurement section removed separately without affecting the outputs of any other sensor in the system and additionally allowing the balance of systems to maintain complete operation.

It is a further object of the present invention to provide a system where each sensor is comprised of its own nuclear shutoff provision to allow each electronic section to be removed safely for servicing or complete replacement without shutting down the system or any requirement to empty the tank for service as is the case in many of the prior art systems.

It is also an object of the present invention to provide a system where the flow through each section of each profiler or sensor can be equipped with tubing and nozzles to clean the nuclear source surface during normal operation to maintain the best possible reading of the profiler.

It is another object of the present invention to enable each sensor to be rotated by a given arc in the clockwise and/or counter-clockwise direction to increase sensor range.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a cross-sectional view of the separate tank with the present invention sensors and profilers positioned around the separation tank at the various levels to which different materials have settled after passing through the weir;

FIG. 4 is a longitudinal cross-sectional view of an individual sensor and profiler of the present invention, the longitudinal cross-sectional view for each sensor being the same;

FIG. 4A is a cross-sectional view along line A-A of FIG. 4 illustrating the cleaning nozzles provided to clean both the nuclear source plus surfaces of the electronic measurement section of the detector;

FIG. 5 is a smaller longitudinal cross-sectional view of an individual sensor and profiler of the present invention from FIG. 4 but the view is rotated 90 degrees in the counter-clockwise direction from FIG. 4;

FIG. 5A is a cross-sectional view along line A-A of FIG. 5 illustrating a section detail showing a rotary shaft that shuts off the radiation path that permits the safe removal of the electronic section allowing repairs or replacement;

FIG. 5B is a cross-sectional view along line B-B is FIG. 5 illustrating a sectional detail of the closure side of the radiation shut off device plus the rotation shutoff device plus the rotation shaft that rotates the nuclear shut-off mechanism;

FIG. 5C is a cross-sectional view along line C-C is FIG. 5 illustrating the outside view of the nuclear shutoff housing;

FIG. 5D is a cross-sectional view along line D-D of FIG. 5 illustrating the internal flow through path of fluids being used to determine the density and therefore the fluids being measured;

FIG. 5E is a cross-sectional view along line E-E of FIG. 5 illustrating the housing that completes the closure of the electronic measurement section;

FIG. 5F is a cross-sectional view along line F-F of FIG. 5 illustrating the cleaning nozzles provided to clean both the nuclear source surfaces plus surfaces of the election measurement section of the detector;

FIG. 7 is a rear end cross-sectional view of any of the sensors depicted in FIG. 3;

FIG. 7A is a longitudinal cross-sectional view in one plane illustrating the bellows depicted in FIG. 6A in place and the addition of a cooling water pipe enveloping operating components of a given sensor for each sensor depicted in FIG. 3, FIG. 7A taken along line A-A of FIG. 7;

FIG. 7B is a cross-sectional view taken along line B-BG of FIG. 7, illustrating the swing and lock handle of the sensor;

FIG. 8B is a combined rear perspective view of the power operator to move rotation of the profiler unit and also to the right is a bottom plan view of the power operator to move rotation of the profiler unit.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
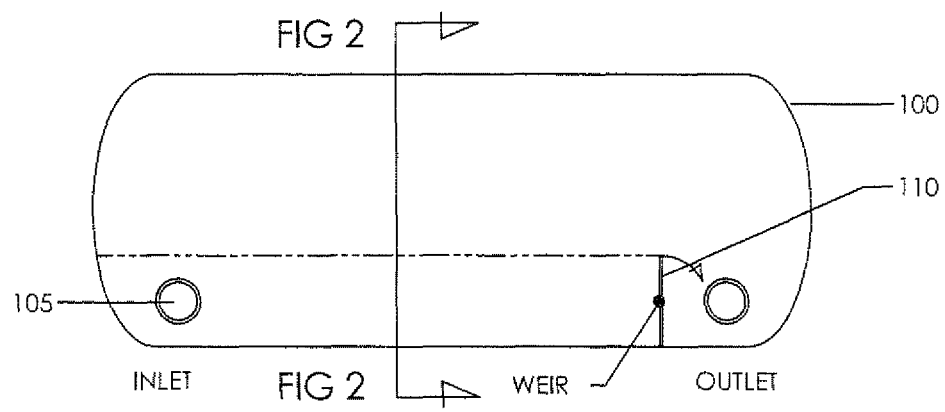
FIG. 1 is a cross-sectional view of a separation tank, illustrating the inlet and outlet nozzles and the weir.

When oil is pumped out of the ground, the oil gushes out of the ground accompanied by many other materials. Referring to FIG. 1, the gushing oil is fed into a separation tank as illustrated in FIG. 1. The separation tank 100 includes an inlet nozzle 105 through which the oil and other materials pass. The separation tank further comprises a weir 110 which acts as a filter.

Figure 2:
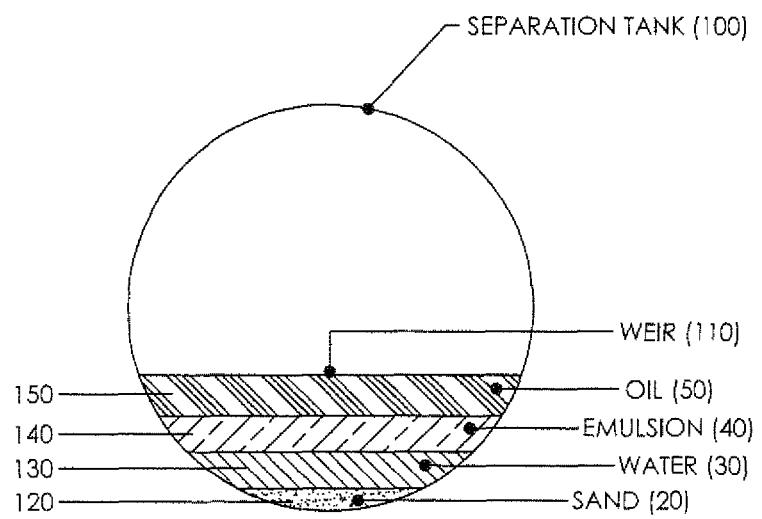
FIG. 2 is a cross-sectional view taken along line 2-2 of FIG. 1, illustrating the different levels to which the materials fall after passing through the weir.

Referring to FIG. 2, there is illustrated a cross-sectional view of the separation tank 100 after the materials have passed through the weir 110. The heaviest material which usually is sand 20 falls to the lowest level 120. The second heaviest material which is water 30 falls to the next higher level 130. The third heaviest material which is emulsion 40 flows to the next higher level 140. The lightest material which is oil 50 floats on the top level 150.

The present invention is a system to completely measure multiple densities in varying levels in tanks or vessels. The present invention provides an individual sensor at each measuring level in the tank, each sensor provided with electronic data to provide continuous density data at leach level. Each sensor is individually placed in the sensor array. If a sensor malfunctions, the individual sensor can be replaced without interrupting the data transmissions or requiring a shutdown of the system to remove the single row array of sensors which are placed together as in the prior art.

The flow of oil and other materials is pumped out of the ground, either through on-land drilling or offshore drilling and then the oil and remaining materials are caused to flow into a separation tank 100 through an inlet 105. The oil and other materials 10 are caused to flow over a weir 110 which is a filter. The heaviest material which usually is sand 20 falls to the lowest level 120. The second heaviest material which is water 30 falls to the next higher level 130. The third heaviest material which is emulsion 40 flows to the next higher level 140. The lightest material 50 which is oil floats on the top level 150.

Referring to FIG. 3 which is an enlarged cross-sectional view take along line 2-2 of FIG. 1, the sensors are placed in an array around the separation tank, with each individual sensor aligned with a given level. Sensors 220 and 230 have their respective openings 222 and 232 aligned with the lowest level 120 and is aligned with the sand 20. Sensors 230A, and 230B have their respective openings 232A, and 232B aligned with the water level 130 and the water 30. Sensors 230C and 240 have their openings aligned with the emulsion level 140 and the emulsion 40. Sensor 250 has its opening 252A aligned with the oil level 150 and Oil 50. The final sensor 250A has its opening 252B above oil level 150 and the oil 50.

Each individual sensor 220, 230, 230A, 230B, 230C, 240, 250 and 250A is completely independent from all other sensors and can have the electronic measurement section removed separately without affecting the outputs of any other sensor in the system and additionally allowing the balance of systems to maintain complete operation.

Referring to FIGS. 4 and 5, there is illustrated an enlarged longitudinal cross-sectional view of any of the sensors, which for this discussion it is assumed is sensor 250. At its distal end, sensor or profiler 250 has a flow through opening 352 which opens at the oil level 150. The sensor 250 includes a nuclear source capsule 357 which is controlled by a nuclear source shutoff mechanism 356 followed by a fluid pass through opening 358 with an air nozzle pressure controller 360. A flow through opening 362 occupies the majority of the space in the detector at this location of the detector. This is followed by a scintillation crystal 364 held by an optical ring 366. In turn, a photo multiplier tube support 368 retains a photomultiplier 370 which leads a detector electronic circuit board 372A including an intrinsically safe electronics unit 372B enclosed by a photo multiplier adjustment assembly cover board 374. The end of the detector which is an enclosure assembly 376 has a heater blanket printed circuit board (PCB) in an enclosure assembly 376. Also illustrated is an input air pressure on/off valve 382 and a shutoff/on latch with key lock. The tank wall 160 is illustrated with a tank mounting flange 400 mounting the detector 250 to the tank wall 160. Also illustrated is a mounting flange 410 on a four (4) inch tube and a mounting flange 420 on a three (3) inch tube. Also included is a shutoff latch with a key lock 380 and an input air pressure on/off valve 382.

The details on the longitudinal cross-sectional view from FIG. 4 are illustrated in a smaller longitudinal cross-sectional view in FIG. 5 of the detector illustrated in FIG. 4, with cross-sectional illustrations taken along section line A-A through F-F from FIG. 5.

FIG. 5A is a cross-sectional view along line A-A of FIG. 5 illustrating a section detail showing a rotary shaft that shuts off the radiation path that permits the safe removal of the electronic section allowing repairs or replacement.

FIG. 5B is a cross-sectional view along line B-B is FIG. 5 illustrating a sectional detail of the closure side of the radiation shut off device plus the rotation shutoff device plus the rotation shaft that rotates the shut-off mechanism.

FIG. 5C is a cross-sectional view along line C-C is FIG. 5 illustrating the outside view of the shutoff housing.

FIG. 5D is a cross-sectional view along line D-D of FIG. 5 illustrating the internal flow thru path of fluids being used to determine the density and therefore the fluids being measured.

FIG. 5E is a cross-sectional view along line E-E of FIG. 5 illustrating the housing that completes the closure of the electronic measurement section.

FIG. 5F is a cross-sectional view along line F-F of FIG. 5 illustrating the cleaning nozzles provided to clean both the nuclear source surfaces plus surfaces of the election measurement section of the detector.

Figure 6A:
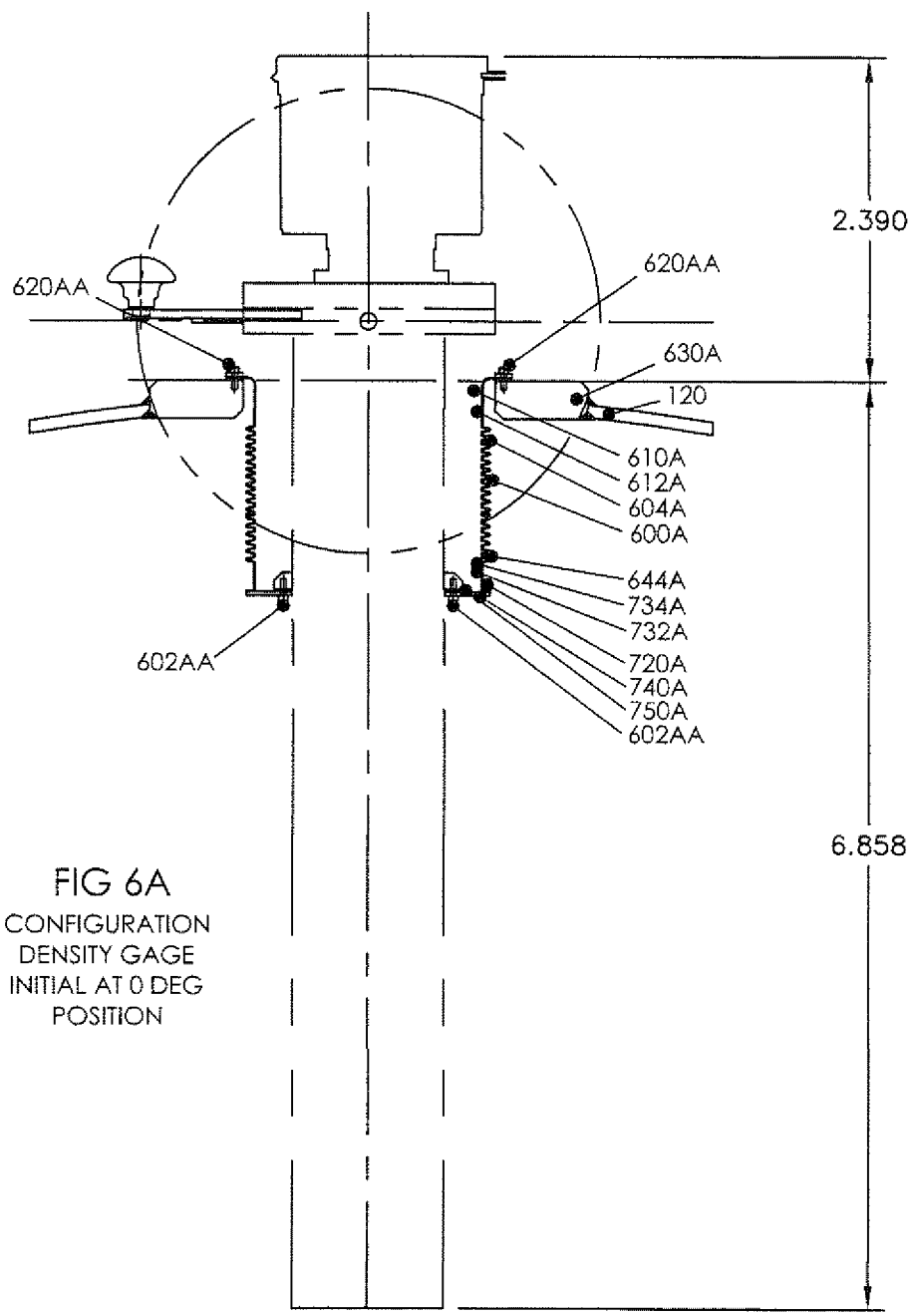
FIG. 6A is a top plan view of a respective one of the detectors illustrated in FIG. 3, each respective detector in its normal orientation.
Figure 6B:
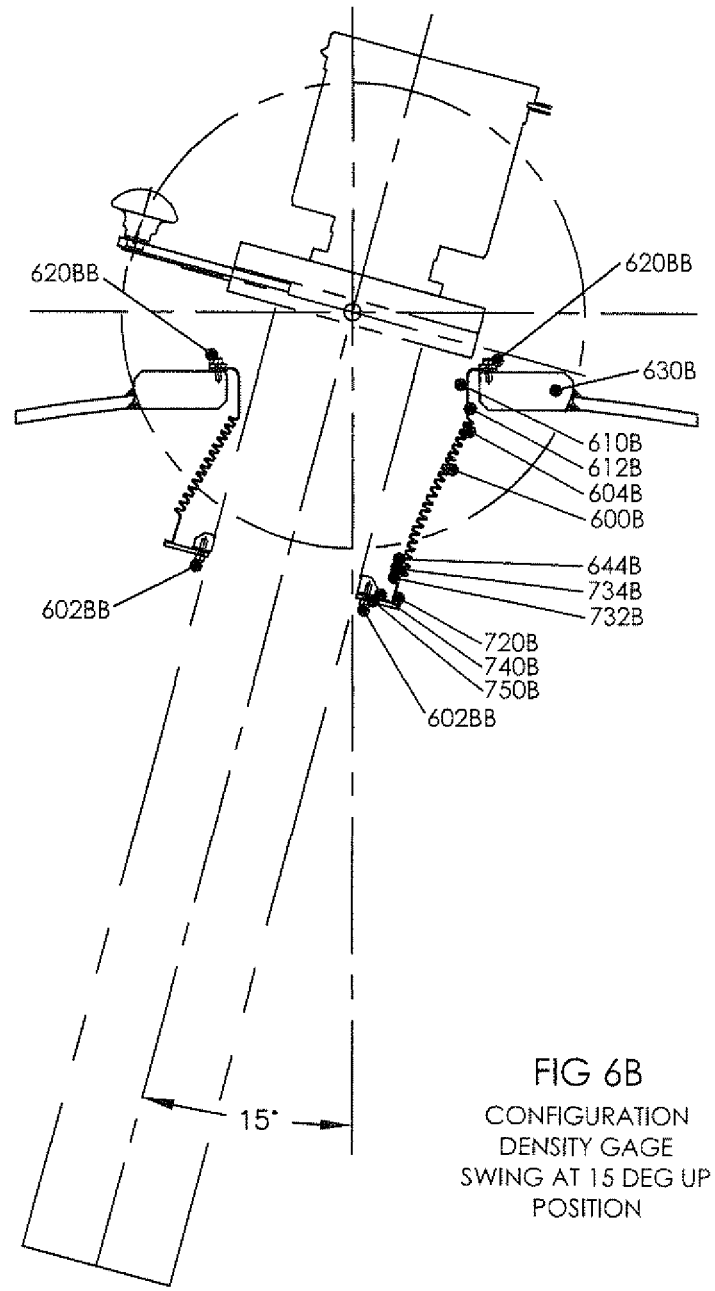
FIG. 6B is a top plan view of the detector illustrated in FIG. 5A with the detector rotated in a fifteen (15) degree clockwise arc.
Figure 6C:
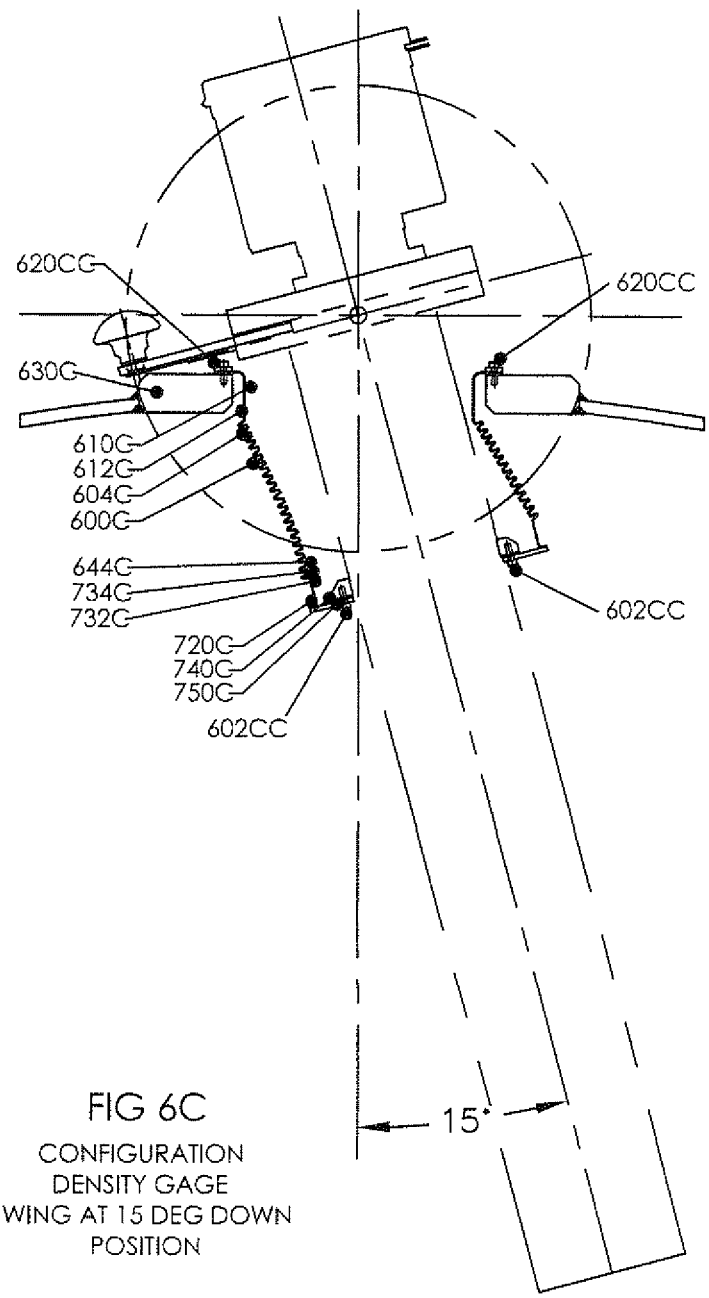
FIG. 6C is a top plan view of the detector illustrated in FIG. 5A with the detector rotated in a fifteen (15) degree counterclockwise arc.

To enhance the range of viewing, each detector can be rotated by a given distance in the clockwise direction and/or the counter-clockwise direction as illustrated in FIGS. 6A through 6C.

FIG. 6A is a top plan view of a respective one of the detectors illustrated in FIG. 3, with each respective detector in its normal orientation. The rotation is achieved by a bellows. A bellows 600A is affixed at its bottom end at a first side 602A and at a second side 602AA. The bellows 600A is affixed at its upper end at a first side 620A and at a second side 620AA to the tank flange (se FIGS. 4 and 5). The bellows 600A has a top connecting rod 610A affixed to plate 630A. The bellows has a bottom connecting rod 732A affixed to a bottom plate 750A. Sections along the length of the flexible bellows are numbered 612A, 604A, 644A, 734A, 720A and 740A.

FIG. 6B is a top plan view of a respective detector illustrated in FIG. 3. Each respective detector is illustrated in its upper 15 degree orientation. The rotation is achieved by a bellows The parts are numbered the same with a B replacing an A. A bellows 600B is affixed at its bottom end at a first side 602B and at a second side 602BB. The bellows 600B is affixed at its upper end at a first side 620B and at a second side 620AA to the tank flange (se FIGS. 4 and 5). The bellows 600B has a top connecting rod 610B affixed to plate 630B. The bellows has a bottom connecting rod 732B affixed to a bottom plate 750B. Sections along the length of the flexible bellows are numbered 612B, 604B, 644B, 734B, 720B and 740B.

FIG. 6C is a top plan view of a respective detector illustrated in FIG. 3. Each respective detector is illustrated in its lower 15 degree orientation. The rotation is achieved by a bellows. The parts are numbered the same with a C replacing an A form FIG. 6A. A bellows 600C is affixed at its bottom end at a first side 602C and at a second side 602CC. The bellows 600C is affixed at its upper end at a first side 620C and at a second side 620CC to the tank flange (se FIGS. 4 and 5). The bellows 600A has a top connecting rod 610C affixed to plate 630C. The bellows has a bottom connecting rod 732C affixed to a bottom plate 750C. Sections along the length of the flexible bellows are numbered 612C, 604C, 644C, 734C, 720C and 740C.

Each sensor is comprised of its own nuclear shutoff provision to allow each electronic section to be removed safely for servicing or complete replacement without shutting down the system or any requirement to empty the tank for service as is the case in many of the prior art systems.

The flow through each section of each profiler or sensor can be equipped with tubing and nozzles to clean the nuclear source surface during normal operation to maintain the best possible reading of the profiler.

The present invention provides the following significant advantages:
(1) Greater on-line time for the system;
(2) Minimum down time in replacement or repair of electronic section;
(3) Greater accuracy of density reading;
(4) Ability to clean detector while in service;
(5) Choice of positions of detectors and numbers of detectors to install to obtain the best operational results.

Referring to FIGS. 5, 7, 7A, 8 and 8A, there is illustrated an enlarged longitudinal cross-sectional view of any of the sensors, which for this discussion it is assumed is sensor 250. At its distal end, complete sensor or profiler 250 has a flow through opening 352 which opens at the oil level 150. The complete sensor 250 includes a nuclear source capsule 357 which is controlled by a nuclear source shutoff mechanism 356 followed by a fluid pass through opening 358 with an air nozzle pressure controller 360. A flow through opening 362 occupies the majority of the space in the detector at this location of the detector.

Figure 8:
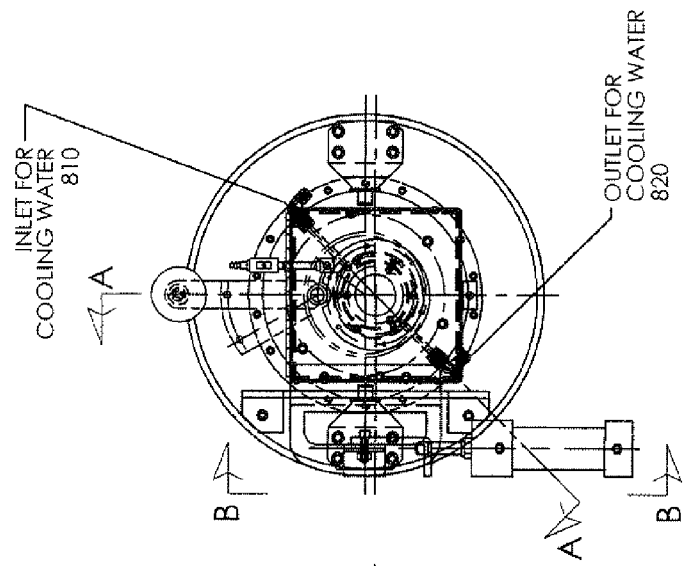
FIG. 8 is a rear cross-sectional view of any of the sensors depicted in FIG. 3, the view rotated 90 degrees counterclockwise from the view of FIG. 7.
Figure 8A:
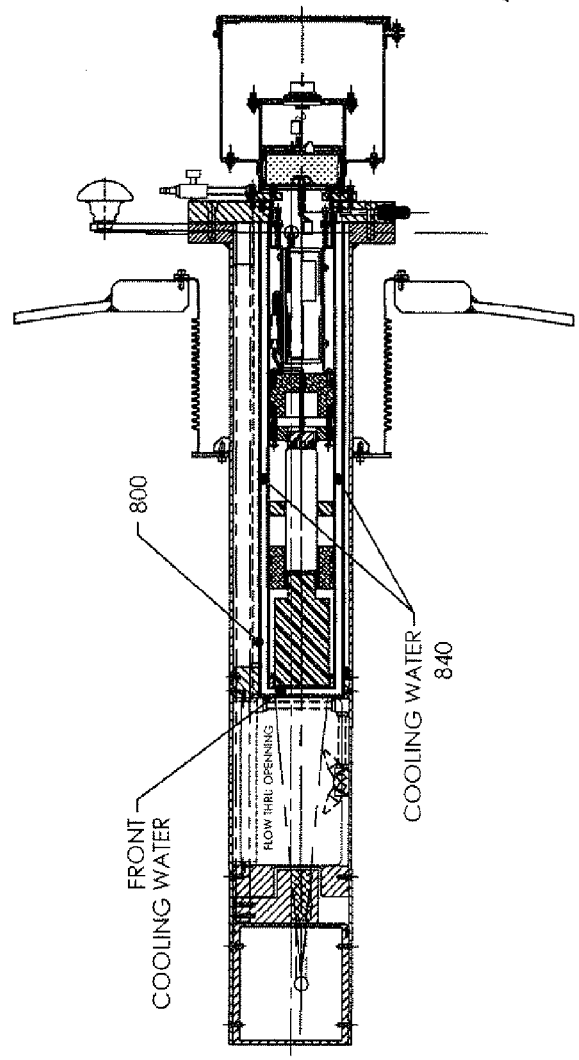
FIG. 8A is a longitudinal cross-sectional view in a second plane illustrating the bellows depicted in FIG. 6A in place and the addition of a cooling water pipe enveloping operating components of a given sensor for each sensor depicted in FIG. 3, FIG. 8A taken along line A-A of FIG. 8.

The following components, also illustrated in FIG. 8, are shown enveloped by a cooling pipe 800 having an inlet opening 820, a pipe body through which cooling water 840 flows, and an outlet 810. The cooling water 840 is held in a large tank reservoir (not illustrated) and cooling water 840 is forced from the reservoir through the inlet opening 825, through the cooling pipe 800, and through the exit outlet 810 and is re-circulated in this way to cool the following components with the cooling water 840: a scintillation crystal 364 held by an optical ring 366, and the photo multiplier tube support 368 which retains a photomultiplier 370. It is these components which are cooled by the cooling water 840 flowing through the cooling pipe 800 which surrounds and envelops these components.

As previously discussed, the photomultiplier 370 leads to a detector electronic circuit board 372 enclosed by a photo multiplier adjustment assembly cover board 374. The end of the detector which is an enclosure assembly 376 has a heater blanket PCB and an enclosure assembly 378. The tank wall 160 is illustrated with a tank mounting flange 400 mounting the detector 250 to the tank wall 160. Also illustrated is a mounting flange 410 on a four (4) inch tube and a mounting flange 420 on a three (3) inch tube. Also included is a shutoff latch with a key lock 380 and an input air pressure on/off valve 382.

The bellows 600A previously discussed is shown in place. For additional clarity, FIG. 8B shows a combined rear perspective view of the power operator to move rotation of the profiler unit and also to the right is a bottom plan view of the power operator to move rotation of the profiler unit.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. For use with a separation tank having an inlet nozzle and a weir, materials from oil well drilling including sand, water, emulsion, and oil are caused to flow through the inlet nozzle into the separation tank and over the weir, a system to completely measure multiple densities in the separation tank, comprising:
   a. the oil and other materials pass over the weir and are separated, the heaviest material which is sand falls to a lowest level, the second heaviest material which is water falls to a next higher level, the third heaviest material which is emulsion flows to the next higher level, the lightest material which is oil floats on a top level;
   b. sensors are placed in an array around the separation tank, with each individual sensor aligned with a given level, a first sensor aligned with the lowest level and having its flow through opening at its distal end aligned with the sand, a second sensor aligned with the next higher level which is the water level and having its flow through opening at its distal end with the water, a third sensor aligned with the next higher emulsion level and having its flow through opening at its distal end aligned with the emulsion, and a fourth sensor aligned with the highest level which is the oil level and having its flow through opening aligned with oil;
   c. each individual sensor is completely independent from all other sensors and is able to have its electronic measurement section removed separately without affecting the outputs of any other sensor in the system and additionally allowing the balance of the system to maintain complete operation;
   d. each sensor includes a photo-multiplier, and a flange to individually retain the sensor to the separation tank;
   e. each sensor is comprised of its own nuclear shutoff provision to allow each electronic section to be removed safely for servicing or complete replacement without shutting down the system or any requirement to empty the separation tank for service;
   f. the flow through of each section of each sensor is equipped with tubing and nozzles to clean the nuclear source surface during operation to maintain the best possible reading of the sensor; and
   g. each sensor is connected to a computer readout which receives a reading from the sensor to determine the density of a material at location of the layer where a sensor is located, the density determining whether the material is sand, water, emulsion or oil.

2. The system in accordance with claim 1, each sensor further comprising:
   a. a distal end having a flow through opening which opens at its given level, the sensor includes a nuclear source capsule which is controlled by a nuclear source shutoff mechanism followed by a fluid pass through opening with an air nozzle pressure controller, a flow through opening occupies the majority of the space in the detector at this location of the detector, followed by a scintillation crystal held by an optical ring, a photomultiplier retained by a photomultiplier tube which leads to a detector electronic circuit board enclosed by a cover board; and
   the end of the detector opposite the distal end having a heater blanket PCB and an enclosure assembly, the detector wall having at least one tank mounting flange.

3. The system in accordance with claim 2 further comprising:
   a. a cooling pipe having a cooling water inlet and cooling water outlet, cooling water re-circulated through the cooling pipe; and
   b. the cooling pipe enveloping and cooling the scintillation crystal, cylgard retainer and photomultiplier.

4. The system in accordance with claim 1, further comprising:
   a. to enhance the range of viewing, each detector is capable of being rotated by a given distance in the clockwise direction and/or the counter-clockwise direction.

5. The system in accordance with claim 4, further comprising:
   a. a bellows affixed to the flange;
   b. in a first embodiment, the bellows is not rotated;
   d. in a second embodiment, the bellows is rotated in an arc in the clockwise direction in an amount up to fifteen (15) degrees, thereby adjusting the orientation of each detector rotated in this way; and
   e. in a third embodiment, the bellows is rotated in an arc in the counter-clockwise direction in an amount up to fifteen (15) degrees, thereby adjusting the orientation of each detector rotated in this way.

6. For use with a separation tank having an inlet nozzle, materials from oil well drilling including sand, water, emulsion, and oil are caused to flow through the inlet nozzle into the separation tank, a system to completely measure multiple densities in the separation tank, comprising:
   a. the oil and other materials in the separation tank are separated, the heaviest material which is sand falls to a lowest level, the second heaviest material which is water falls to a next higher level, the third heaviest material which is emulsion flows to the next higher level, the lightest material which is oil floats on a top level;
   b. sensors are placed in an array around the separation tank, with each individual sensor aligned with at least one separated material in the separation tank;
   c. each individual sensor is completely independent from all other sensors and is able to have its electronic measurement section removed separately without affecting the outputs of any other sensor in the system and additionally allowing the balance of the system to maintain complete operation;

d. each sensor includes a photo-multiplier, and a flange to individually retain the sensor to the separation tank;

e. each sensor is comprised of its own nuclear shutoff provision to allow each electronic section to be removed safely for servicing or complete replacement without shutting down the system or any requirement to empty the separation tank for service;

f. the flow through of each section of each sensor is equipped with tubing and nozzles to clean the nuclear source surface during operation to maintain the best possible reading of the sensor; and g. each sensor is connected to a computer readout which receives a reading from the sensor to determine the density of a material at location of the layer where a sensor is located, the density determining whether the material is sand, water, emulsion or oil.

7. The system in accordance with claim 6, each sensor further comprising:

a. a distal end having a flow through opening which opens at its given level, the sensor includes a nuclear source capsule which is controlled by a nuclear source shutoff mechanism followed by a fluid pass through opening with an air nozzle pressure controller, a flow through opening occupies the majority of the space in the detector at this location of the detector, followed by a scintillation crystal held by an optical ring, a photomultiplier retained by a photomultiplier tube support which leads to a detector electronic circuit board enclosed by a cover board; and b. the end of the detector opposite the distal end having a heater blanket PCB and an enclosure assembly, the detector wall having at least one tank mounting flange.

8. The system in accordance with claim 7, further comprising:

a. a cooling pipe having a cooling water inlet and cooling water outlet, cooling water re-circulated through the cooling pipe; and b. the cooling pipe enveloping and cooling the scintillation crystal, cylgard retainer and photomultiplier.

9. The system in accordance with claim 6, further comprising:

a. to enhance the range of viewing, each detector can be rotated by a given distance in the clockwise direction and/or the counter-clockwise direction.

10. The system in accordance with claim 6, further comprising:

a. a bellows affixed to the flange;

b. in a first embodiment, the bellows is not rotated;

c. in a second embodiment, the bellows is rotated in an arc in the clockwise direction in an amount up to fifteen (15) degrees, thereby adjusting the orientation of each detector rotated in this way; and d. in a third embodiment, the bellows is rotated in an arc in the counter-clockwise direction in an amount up to fifteen (15) degrees, thereby adjusting the orientation of each detector rotated in this way.

11. For use with a separation tank having an inlet nozzle and a weir, materials from oil well drilling including sand, water, emulsion, and oil are caused to flow through the inlet nozzle into the separation tank and over the weir, a system to completely measure multiple densities in the separation tank, comprising:

a. the oil and other material pass over the weir and are separated, the heaviest material which is sand falls to a lowest level, the second heaviest material which is water falls to the next higher level, the third heaviest material which is emulsion flows to the next higher level, the lightest material which is oil floats on a top level;

b. sensors are placed in an array around the separation tank, with each individual sensor aligned with a given level, a first sensor aligned with the lowest level and having its flow through opening at its distal end aligned with the sand, a second sensor aligned with the next higher level which is the water level and having its flow through opening at its distal end with the water, a third sensor aligned with the next higher emulsion level and having its flow through opening at its distal end aligned with the emulsion, and a fourth sensor aligned with the highest level which is the oil level and having its flow through opening aligned with oil;

c. each individual sensor is completely independent from all other sensors and is able to have its electronic measurement section removed separately without affecting the outputs of any other sensor in the system and additionally allowing the balance of the system to maintain complete operation;

d. each sensor includes a photo-multiplier, and a flange to individually retain the sensor to the separation tank;

e. each sensor is comprised of its own nuclear shutoff provision to allow each electronic section to be removed safely for servicing or complete replacement without shutting down the system or any requirement to empty the separation tank for service; and f. each sensor is connected to a computer readout which receives a reading from the sensor to determine the density of a material at a location of the layer where a sensor is located, the density determining whether the material is sand, water, emulsion or oil.

12. The system in accordance with claim 11, each sensor further comprising:

a. a distal end having a flow through opening which opens at its given level, the sensor includes a nuclear source capsule which is controlled by a nuclear source shutoff mechanism followed by a fluid pass through opening with an air nozzle pressure controller, a flow through opening occupies the majority of the space in the detector at this location of the detector, followed by a scintillation crystal held by an optical ring, a photomultiplier retained by a photomultiplier support tube which leads to a detector electronic circuit board enclosed by a cover board; and b. the end of the detector opposite the distal end having a heater blanket PCB and an enclosure assembly, the detector wall having at least one tank mounting flange.

13. The system in accordance with claim 12, further comprising:

a. a cooling pipe having a cooling water inlet and cooling water outlet, cooling water re-circulated through the cooling pipe; and b. the cooling pipe enveloping and cooling the scintillation crystal, cylgard retainer and photomultiplier.

14. The system in accordance with claim 11, further comprising:

a. to enhance the range of viewing, each detector can be rotated by a given distance in the clockwise direction and/or the counter-clockwise direction.

15. The system in accordance with claim 11, further comprising:
   a. a bellows affixed to the flange;
   b. in a first embodiment, the bellows is not rotated;
   c. in a second embodiment, the bellows is rotated in an arc in the clockwise direction in an amount up to fifteen (15) degrees, thereby adjusting the orientation of each detector rotated in this way; and
   d. in a third embodiment, the bellows is rotated in an arc in the counter-clockwise direction in an amount up to fifteen (15) degrees, thereby adjusting the orientation of each detector rotated in this way.

16. For use with a separation tank having an inlet nozzle, materials from oil well drilling including sand, water, emulsion, and oil are caused to flow through the inlet nozzle into the separation tank, a system to completely measure multiple densities in the separation tank, comprising:
   a. the oil and other materials in the separation tank and are separated, the material which is sand falls to a lowest level, the second heaviest material which is water falls to a next higher level, the third heaviest material which is emulsion flows to the next higher level, the lightest material which is oil floats on a top level;
   b. sensors are placed in an array around the separation tank, with each individual sensor aligned with at least one separated material in the separation tank;
   c. each individual sensor is completely independent from all other sensors and is able to have its electronic measurement section removed separately without affecting the outputs of any other sensor in the system and additionally allowing the balance of the system to maintain complete operation;
   d. each sensor includes a flange to individually retain the sensor to the separation tank;
   e. each sensor is comprised of its own nuclear shutoff provision to allow each electronic section to be removed safely for servicing or complete replacement without shutting down the system or any requirement to empty the separation tank for service; and
   f. each sensor is connected to a computer readout which receives a reading from the sensor to determine the density of a material at location of the layer where a sensor is located, the density determining whether the material is sand, water, emulsion or oil.

17. A system to completely measure multiple densities in varying levels in tanks, comprising:
   a. providing an individual sensor at each measuring level in the tank, each sensor provided with electronic data to provide continuous density data at each level;
   b. each sensor is individually placed in a sensor array and is completely independent from all other sensors, each individual sensor having a shutoff mechanism located outside of the separation tank; and
   c. if a sensor malfunctions, the individual sensor is shut off by its respective shutoff mechanism, and is replaced without interrupting the data transmissions and not requiring a shutdown.

18. The system in accordance with claim 17, further comprising:
   a. each sensor is complete with its own nuclear shutoff provision to allow each electronics section to be safely removed without shutting down the system.

19. A system to completely measure multiple densities at varying levels in tanks, comprising:
   a. nuclear technology to provide electronic data continuous density data at each level provided by each individual sensor locked in the tank;
   b. each individual sensor is completely independent from all other sensors, each individual sensor having a shutoff mechanism located outside of the separation tank;
   c. each individual sensor can have its respective electronic measurement removed separately without affecting the outputs of any other sensor in the system plus allowing the balance of systems to maintain complete operation; and
   d. if a sensor malfunctions, the individual sensor is shutoff by its respective shutoff mechanism, and is replaced without interrupting any data transmission and requiring a shutdown.

20. The system in accordance with claim 19, further comprising:
   a. each sensor is complete with its own nuclear shutoff provision to allow each electronic section to be removed safely for servicing or complete replacement without shutting down the system or any requirement to empty the tank for service.

21. The system in accordance with claim 19, further comprising:
   a. the sensor includes a flow-through section of each profiler so that it can be equipped with tubing and nozzles to clean the nuclear source surface and electronic pickup surfaces during normal operation to maintain the best possible reading of the profiler.

* * * * *